United States Patent
Nakatani et al.

(10) Patent No.: US 9,233,848 B2
(45) Date of Patent: Jan. 12, 2016

(54) OZONE GENERATION SYSTEM AND METHOD FOR OPERATING OZONE GENERATION SYSTEM

(75) Inventors: Hajime Nakatani, Tokyo (JP); Tetsuya Tamura, Chiyoda-ku (JP); Norimitsu Esaki, Chiyoda-ku (JP); Yoshiaki Odai, Chiyoda-ku (JP); Tomoaki Takeda, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 171 days.

(21) Appl. No.: 13/979,585

(22) PCT Filed: Apr. 13, 2011

(86) PCT No.: PCT/JP2011/059170
§ 371 (c)(1),
(2), (4) Date: Jul. 12, 2013

(87) PCT Pub. No.: WO2012/140749
PCT Pub. Date: Oct. 18, 2012

(65) Prior Publication Data
US 2013/0313106 A1 Nov. 28, 2013

(51) Int. Cl.
*C01B 13/11* (2006.01)
(52) U.S. Cl.
CPC .............. *C01B 13/11* (2013.01); *C01B 2201/64* (2013.01); *C01B 2201/76* (2013.01); *C01B 2201/90* (2013.01)
(58) Field of Classification Search
CPC C01B 13/11; C01B 2201/90; C01B 2201/64; C01B 2201/76
See application file for complete search history.

(56) References Cited

U.S. PATENT DOCUMENTS

| 5,106,589 A | 4/1992 | Conrad |
| 5,759,497 A | 6/1998 | Kuzumoto et al. |
| 5,948,374 A | 9/1999 | Kuzumoto et al. |

(Continued)

FOREIGN PATENT DOCUMENTS

| CA | 2742161 A1 | 6/2008 |
| JP | 61-068195 A | 4/1986 |

(Continued)

OTHER PUBLICATIONS

European Search Report issued on Sep. 15, 2014, in corresponding European Patent Application No. 11863484.9. (7 pages).

(Continued)

*Primary Examiner* — Kishor Mayekar
(74) *Attorney, Agent, or Firm* — Buchanan Ingersoll & Rooney PC

(57) ABSTRACT

An ozone generation system comprises an electricity charge unit price storing part which stores an electricity charge unit and a gas charge unit price storing part which stores a gas charge unit price, based on the electricity charge unit price, the gas charge unit price and necessary generation amount of ozone which is required for an ozonized gas, regarding an ozone concentration and a gas flow rate which are ozone generation amount basic parameters, values at which a running cost is a minimum are determined, a gas flow rate controller is controlled so as for a gas flow rate to be the determined gas flow rate and power of a power supply for an ozone generator is controlled so as for an ozone concentration to be the determined ozone concentration.

8 Claims, 14 Drawing Sheets

(56) References Cited

U.S. PATENT DOCUMENTS

| | | |
|---|---|---|
| 6,027,701 A | 2/2000 | Ishioka et al. |
| 6,093,289 A | 7/2000 | Kuzumoto et al. |
| 2007/0020160 A1 | 1/2007 | Berkman et al. |
| 2010/0101936 A1 | 4/2010 | Hansson |
| 2013/0168230 A1 | 7/2013 | Hansson |
| 2013/0169397 A1 | 7/2013 | Hansson |

FOREIGN PATENT DOCUMENTS

| | | |
|---|---|---|
| JP | 2-160607 A | 6/1990 |
| JP | 7-277708 A | 10/1995 |
| JP | 8-073203 A | 3/1996 |
| JP | 8-322918 A | 12/1996 |
| JP | 9-019695 A | 1/1997 |
| JP | 9-315803 A | 12/1997 |
| JP | 11-171505 A | 6/1999 |
| JP | 3545257 B2 | 7/2004 |
| JP | 2009-500855 A | 1/2009 |
| WO | 2008/074767 A2 | 6/2008 |

OTHER PUBLICATIONS

International Search Report (PCT/ISA/210) issued on Jul. 19, 2011, by the Japanese Patent Office as the International Searching Authority for International Application No. PCT/JP2011/059170.

Igehara et al., "High Efficieny, Hich Concentration Ozone Generator Based on Narrow Gap Technology", Paper presented in World Congress on Ozone & Ultraviolet Technologies, Aug. 2007, pp. 1-12.

Office Action issued on Nov. 1, 2011, by the Japanese Patent Office for Application No. 2011-536690.

Canadian Office Action dated Apr. 8, 2015 issued in corresponding Canadian Patent Appln. No. 2,832,718 (3 pages).

OPTIMUM OZONE GENERATION TABLE

|  |  | COOLING WATER TEMPERATURE [°C] | | | | | | |
|---|---|---|---|---|---|---|---|---|
|  |  | 5 | 10 | 15 | 20 | 25 | 30 | 35 |
| OZONE GENERATING AMOUNT [kg/h] | 1 | 17.0 | 16.5 | 16.0 | 15.5 | 15.0 | 14.5 | 14.0 |
|  | 2 | 16.5 | 16.0 | 15.5 | 15.0 | 14.5 | 14.0 | 13.5 |
|  | 3 | 16.0 | 15.5 | 15.0 | 14.5 | 14.0 | 13.5 | 13.0 |
|  | 4 | 15.5 | 15.0 | 14.5 | 14.0 | 13.5 | 13.0 | 12.5 |
|  | 5 | 15.0 | 14.5 | 14.0 | 13.5 | 13.0 | 12.5 | 12.0 |
|  | 6 | 14.5 | 14.0 | 13.5 | 13.0 | 12.5 | 12.0 | 11.5 |
|  | 7 | 14.0 | 13.5 | 13.0 | 12.5 | 12.0 | 11.5 | 11.0 |
|  | 8 | 13.5 | 13.0 | 12.5 | 12.0 | 11.5 | 11.0 | 10.5 |
|  | 9 | 13.0 | 12.5 | 12.0 | 11.5 | 11.0 | 10.5 | 10.0 |
|  | 10 | 12.5 | 12.0 | 11.5 | 11.0 | 10.5 | 10.0 | 9.5 |
|  | 11 | 12.0 | 11.5 | 11.0 | 10.5 | 10.0 | 9.5 | 9.0 |
|  | 12 | 11.5 | 11.0 | 10.5 | 10.0 | 9.5 | 9.0 | 8.5 |
|  | 13 | 11.0 | 10.5 | 10.0 | 9.5 | 9.0 | 8.5 | 8.0 |
|  | 14 | 10.5 | 10.0 | 9.5 | 9.0 | 8.5 | 8.0 | 7.5 |
|  | 15 | 10.0 | 9.5 | 9.0 | 8.5 | 8.0 | 7.5 | 7.0 |

FIG. 5

OPTIMUM GAS FLOW RATE TABLE

| | | COOLING WATER TEMPERATURE [°C] | | | | | | |
|---|---|---|---|---|---|---|---|---|
| | | 5 | 10 | 15 | 20 | 25 | 30 | 35 |
| OZONE GENERATING AMOUNT [kg/h] | 1 | 1.43 | 6.06 | 6.25 | 6.45 | 6.67 | 6.90 | 7.14 |
| | 2 | 1.21 | 12.5 | 12.9 | 13.3 | 13.8 | 14.3 | 14.8 |
| | 3 | 18.8 | 19.4 | 20.0 | 20.7 | 21.4 | 22.2 | 23.1 |
| | 4 | 25.8 | 26.7 | 27.6 | 28.6 | 29.6 | 30.8 | 32.0 |
| | 5 | 33.3 | 34.5 | 35.7 | 37.0 | 38.5 | 40.0 | 41.7 |
| | 6 | 41.4 | 42.9 | 44.4 | 46.2 | 48.0 | 50.0 | 52.2 |
| | 7 | 50.0 | 51.9 | 53.8 | 56.0 | 58.3 | 60.9 | 63.6 |
| | 8 | 59.3 | 61.5 | 64.0 | 66.7 | 69.6 | 72.7 | 76.2 |
| | 9 | 69.2 | 72.0 | 75 | 78.3 | 81.8 | 85.7 | 90.0 |
| | 10 | 80.0 | 83.3 | 87.0 | 90.9 | 95.2 | 100 | 105 |
| | 11 | 91.7 | 95.7 | 100 | 105 | 110 | 116 | 122 |
| | 12 | 104 | 109 | 114 | 120 | 126 | 133 | 141 |
| | 13 | 118 | 124 | 130 | 137 | 144 | 153 | 163 |
| | 14 | 133 | 140 | 147 | 156 | 165 | 175 | 187 |
| | 15 | 150 | 158 | 167 | 176 | 188 | 200 | 214 |

FIG. 7

OZONE GENERATION SYSTEM AND METHOD FOR OPERATING OZONE GENERATION SYSTEM

TECHNICAL FIELD

This invention relates to an ozone generation system which generates ozone for ozone treatment, such as treatment of clean water, discharge water, industrial drainage, pulp bleaching, and oxidation treatment, etc,

BACKGROUND ART

An outline of ozone treatment of clean water will be described below. Raw material gas (an oxygen gas to which a trace amount of nitrogen gas is added, or air) is supplied to an ozone generator, in a discharge tube inside of the ozone generator, the raw material gas is discharged by a high-frequency high voltage which is supplied from a power supply, and by this discharge, the oxygen gas in the raw material gas is changed to be an ozonized gas. In the ozone generator, heat which is generated by discharge is cooled by cooling water. The ozonized gas which is generated in the ozone generator is fed to an air diffuser from a bottom part of an ozone contact tank; the ozonized gas is fed to water to be treated as small air bubble and is dissolved in water. An organic substance in water to be treated such as an odor component, bacteria, etc. is oxidatively decomposed by ozone. As a result, the water to be treated is discharged from the ozone contact tank as odorless and sterilized water.

A ozone generation amount which is necessary for treatment of an ozone contact tank is determined by quantity of flow of water to be treated, water quality, water temperature, etc. Regarding a method for obtaining necessary ozone generation amount, there is a case in which the necessary amount of ozone is determined by performing experiments in advance, and another case in which dissolved ozone concentration in the ozone contact tank is measured and then feedback is applied. In order to generate necessary amount of ozone which is obtained by the above-mentioned methods, in conventional devices in which an oxygen gas (a trace amount of nitrogen is included) is used as raw material gas, the devices are operated to adjust the flow rate of an ozonized gas with constant ozone concentration.

(ozone generation amount)=(ozone concentration)×
(the flow rate of an ozonized gas)

A running cost of a device is total of an electricity charge which is consumed by an ozone generator and a gas charge of liquid oxygen. In general, as an ozone concentration increases, efficiency of an ozone generator decreases. Consequently, electricity consumption increases, therefore, an electricity charge increases. On the other hand, as an ozone concentration increases, necessary flow rate of an ozonized gas decreases. Consequently, a gas charge decreases. As a result, it is known such that a running cost is a minimum at a certain ozone concentration. (For example, Patent Document 1, Non-Patent Document 1) An ozone concentration at which a running cost is a minimum is affected by the configuration of a discharge tube of an ozone generator, cooling water temperature, etc.

Further, in Europe and the United States, injectors are commonly used as a device for dissolving an ozonized gas in water and injector pumps are used for feeding water to the injectors. When an ozone concentration increases, a flow rate of an ozonized gas decreases, and an amount of water which flows in an injector decreases. Consequently, an electricity charge of the injector decreases. For example, in some cases, by operating an ozone generator at a higher ozone concentration, a running cost is lower. An ozone concentration which has been commonly used conventionally is 10 wt %, however, for example, in some cases, by operating the ozone generator at concentration 16 wt %, a running cost is lower.

On the other hand, there is a method for improving ozone generation efficiency at a high ozone concentration, for example, a method for shortening a discharge tube gap length (Patent Document 2)

PRIOR ART REFERENCE

Patent Document

[Patent Document 1]
Japanese Patent Application Laid-Open No. 61-68195
[Patent Document 2]
Japanese Patent No. 3545257

Non-Patent Document

[Non-Patent Document 1]
"High Efficiency, High Concentration Ozone Generator Based on Narrow Gap Technology" Paper presented in World Congress on Ozone & Ultraviolet Technologies (Aug. 27 to 29, 2007 in Los Angeles, Calif.) (FIG. 7)

DISCLOSURE OF THE INVENTION

Problems to be Solved by the Invention

Regarding conventional devices, there is a problem such that when an ozone concentration increases, a running cost decreases, however, when an ozone concentration increases, an initial cost increases. When an ozone concentration is increased under the condition in which an ozone generation amount is fixed, efficiency of ozone generation in an ozone generator decreases. Therefore, it is necessary to increase power capacity of a power supply; in addition to that, it is necessary to increase the number of discharge tubes which is mounted on an ozone generator. Consequently, an initial cost of an ozone generator is increased. A life cycle cost is total of an initial cost and a running cost. For example, in an ozone generator in which a running cost is a minimum at ozone concentration 14 wt %, in some cases, a life cycle cost is a minimum at ozone concentration 10 wt %. Consequently, regarding design of a device, a device is designed and manufactured at ozone concentration 10 wt % when a life cycle cost is a minimum; and users operate the device at ozone concentration 10 wt % (fixed).

In order to resolve the above-mentioned problems, this invention was made, and this invention intends to provide a method in which a running cost of a device is decreased without increasing an initial cost of a device, and an ozone generation system.

Means for Solving the Problems

An ozone generation system according to this invention comprises an ozone generator having a discharge tube, a raw material gas supply device which supplies raw material gas containing oxygen, a power supply for an ozone generator which applies a high-frequency high voltage to the discharge tube, a cooling device which flows cooling water to the periphery of the discharge tube, a gas flow rate controller which controls the flow rate of an ozonized gas which is outputted from the ozone generator, an ozone concentration measuring device which measures an ozone concentration, and a controller which controls power of the power supply for an ozone generator and the gas flow rate controller, wherein the controller comprises an electricity charge unit price storing part which stores an electricity charge unit, and a gas charge unit price storing part which stores a gas charge unit price; and based on an electricity charge unit price which is stored in the electricity charge unit price storing part, a gas charge unit price which is stored in the gas charge unit price storing part, and necessary generation amount of ozone which is required for an ozonized gas, regarding an ozone concentration and a gas flow rate which are basic parameters of ozone generation amount, a value is determined so as for a running cost to be a minimum, and the gas flow rate controller is controlled so as for a gas flow rate to be the determined value, and power of the power supply for an ozone generator is controlled so as for an ozone generation to be the determined value.

Advantage of the Invention

As ozone generation system according to this invention has the above-mentioned configuration, necessary amount of ozone can be generated under the operation condition at which a running cost is the lowest. Consequently, an ozone generation system having a low running cost can be provided.

BRIEF DESCRIPTION OF THE DRAWINGS

FIG. 5 is a table showing one example of data which is stored in an ozone generation amount basic parameter optimum value storing part which constitutes an ozone generation system according to Embodiment 1 of this invention.

FIG. 7 is a table showing another example of data which is stored in an ozone generation amount basic parameter optimum value storing part which constitutes an ozone generation system according to Embodiment 1 of this invention.

EMBODIMENTS FOR CARRYING OUT THE INVENTION

Embodiment 1

Figure 1:
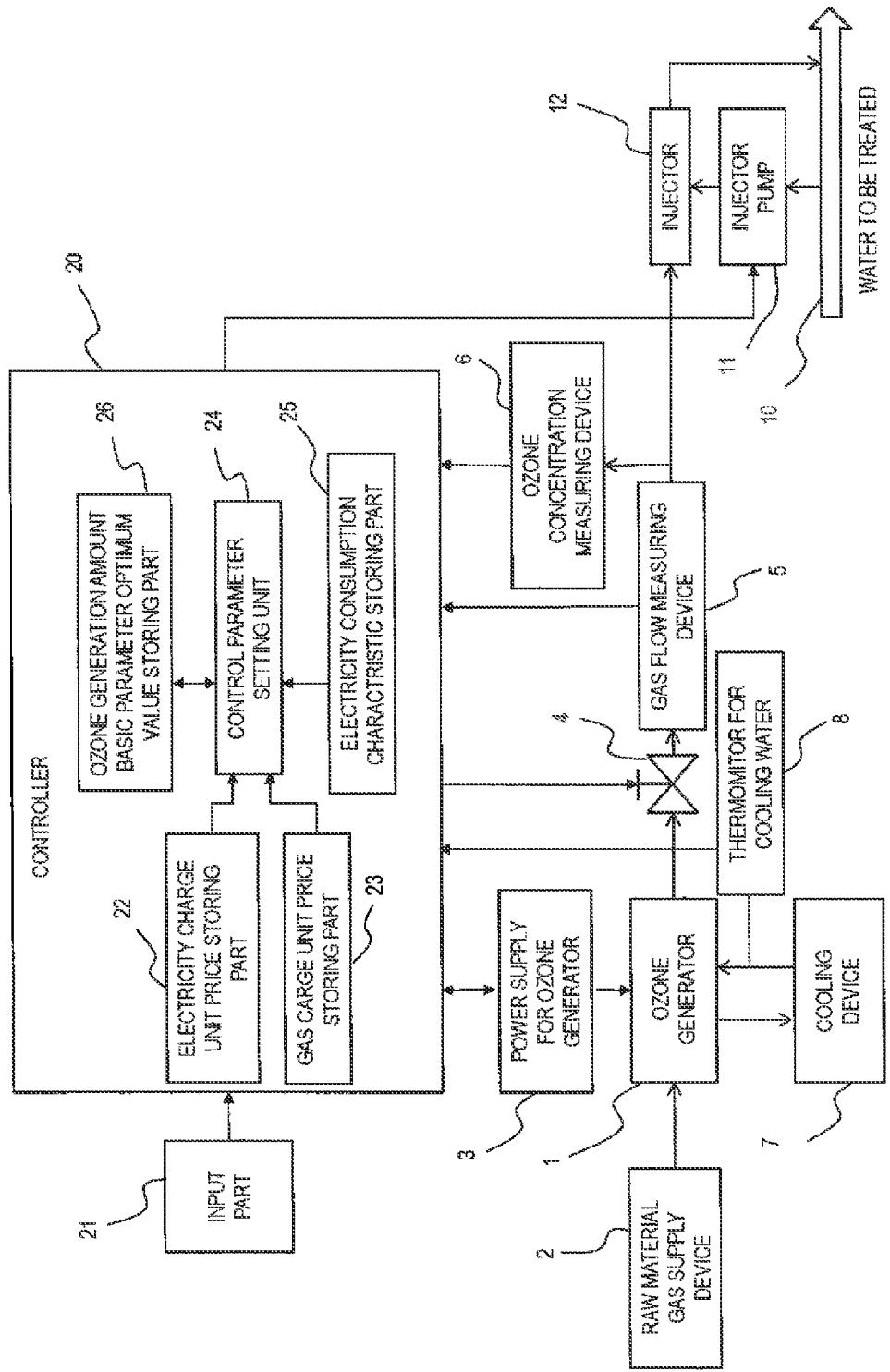
FIG. 1 is a block diagram showing the rough constitution of an ozone generation system according to Embodiment 1 of this invention.

FIG. 1 is a block diagram showing the rough constitution of an ozone generation system according to Embodiment 1 of this invention. Here, a system in which clean water as water to be treated is treated by an ozonized gas will be described as an example. Raw material gas is supplied from a raw material gas supply device 2 to an ozone generator 1. The raw material gas contains an oxygen gas as a main component and a trace amount of nitrogen gas is added thereto. The raw material gas supply device 2 is, for example, a liquid oxygen storage tank. A power supply for an ozone generator 3 which generates a high-frequency high voltage is connected to the ozone generator 1. When a discharge occurs in a discharge tube inside the ozone generator 1, a part of oxygen gas in the raw material gas is changed to be ozone by discharge so as to be an ozonized gas. A gas flow rate control valve 4 and a gas flow measuring device 5 are connected to outlet piping of the ozone generator 1, and a part of the ozonized gas is sampled and the sampled gas goes into an ozone concentration measuring device 6. Heat which is generated by discharge in the ozone generator 1 is cooled by cooling water from a cooling device 7. A temperature of cooling water is measured by a thermometer for cooling water 8. A part of water to be treated 10 which is an object treated with an ozonized gas is fed to an injector 12 through an injector pump 11, the ozonized gas which is guided to the injector 12 is dispersed as fine bubble in water by the injector 12, and ozone is dissolved in water. Water which is discharged from the injector 12 is merged with water to be treated and is guided to an ozone reaction tank, and an organic substance in water is oxidatively decomposed by ozone.

Figure 2:
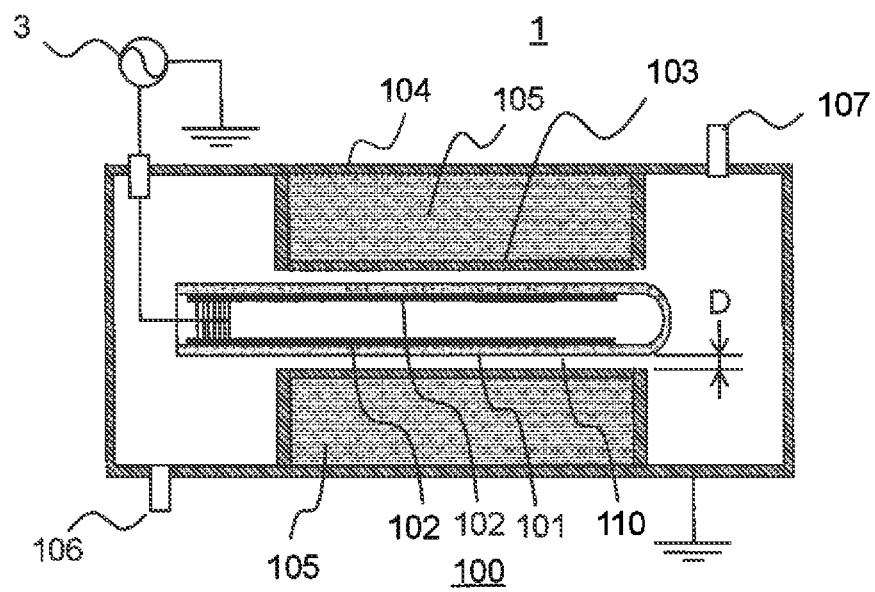
FIG. 2 is a cross-sectional view showing the rough configuration of an ozone generator which constitutes an ozone generation system according to Embodiment 1 of this invention.

Here, a general outline of the ozone generator 1 will be described. FIG. 2 is a cross-sectional view showing the basic configuration of an ozone generator which is used for water treatment, etc. A metallic film 102 which functions as a high-voltage electrode is formed on an inner wall of a dielectric tube 101 such as a cylindrically-shaped glass tube, a cylindrically-shaped metallic tube 103 which functions as a ground electrode is disposed concentrically at outside of the dielectric tube 101. The metallic tube 103 is attached to an ozone generation tank 104 which is electrically grounded. The dielectric tube 101 at which the metallic film 102 is formed and the metallic tube 103 constitute a discharge tube 100. When a high-frequency high voltage is supplied from a power supply for an ozone generator 3 to the metallic film 102, and a high-frequency high voltage is applied between the metallic film 102 and the metallic tube 103, a discharge occurs in a discharge gap 110 between the dielectric tube 101 and the metallic tube 103. The discharge gap 110 is extremely narrow gap, for example, discharge gap length D is 0.3 mm. It is configured such that cooling water 105, for cooling heat which is generated by discharge, flows from the cooling device 7 and circulates around the periphery of the metallic tube 103. Raw material gas is introduced from the raw material gas supply device 2 through raw material gas inlet piping 106. While the raw material gas which is introduced passes the discharge gap 110, the raw material gas is changed to be an ozonized gas by discharge, and the ozonized gas is outputted from outlet piping 107. In FIG. 2, only one piece of the discharge tube 100 is shown, however, in a large-capacity ozone generator 1, a plurality of discharge tubes 100, for example, approximately 1000 pieces of discharge tubes are disposed in parallel per one, that is, per one ozone tank 104.

In a controller 20 which controls an ozone generation system, an electricity charge unit price and an oxygen gas charge unit price are inputted from an input part 21 so as to be stored in an electricity charge unit price storing part 22 and a gas charge unit price storing part 23, respectively. On the other hand, a power measured value of a power supply is inputted from the power supply for an ozone generator 3, a gas flow rate measured value is inputted from the gas flow measuring device 5, an ozone concentration measured value is inputted from an ozone concentration measuring device 6, and a cooling water temperature measured value is inputted from a thermometer for cooling water 8. Further, necessary ozone generation amount is inputted as a command value to the controller 20 from another controller. In the controller 20, a running cost is evaluated at real time by a control parameter setting unit 24, at this point, each parameter is determined so as for an ozone generation system to operate with minimum running cost, a power command value is outputted to the power supply for an ozone generator 3, an opening command value is outputted to a gas flow rate control valve 4, and an output command value is outputted to an injector pump 11.

Next, the details of operation will be described. The ozone generator 1 and the power supply for an ozone generator 3 are designed so as to obtain maximum ozone generation amount=10 kg/h under the conditions where highest value of cooling water temperature is 30 degrees Celsius and an ozone concentration is 10 wt % as rated maximum power. In general, when a temperature is high in summer, a temperature of cooling water is a maximum. In a case of clean water, quality of water which is taken from rivers or lakes is bad; therefore, maximum ozone generation amount is required. Consequently, in summer, an ozone generator is operated with maximum output of ozone generation amount 10 kg/h at ozone concentration 10 wt %. However, in autumn, spring and winter, quality of water becomes good, necessary amount of ozone generation is reduced. Further, in winter, for example, a temperature of cooling water is reduced to be 10 degrees Celsius. Consequently, efficiency of the ozone generator 1 is improved.

Figure 3:
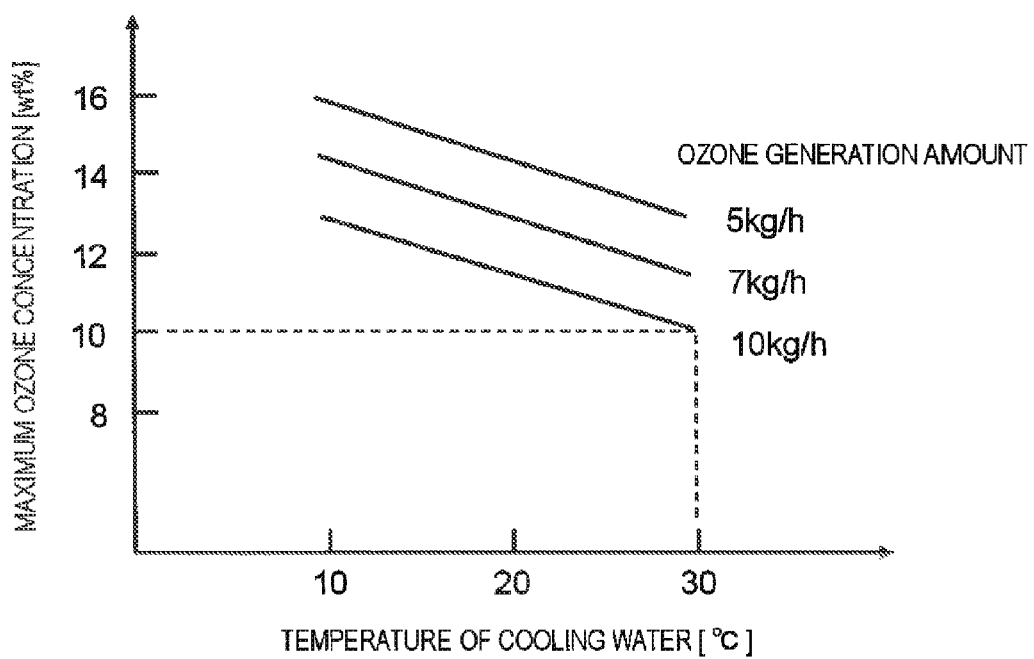
FIG. 3 is a diagrammatic view showing an example of operating characteristics of an ozone generation system to which this invention is applied.

The above-mentioned is shown in FIG. 3. In FIG. 3, a horizontal axis indicates a temperature of cooling water, and a longitudinal axis indicates maximum ozone concentration at which the ozone generator 1 can be operated. In a case where rated ozone generation amount 10 kg/h is generated, at an operating point where broken lines are intersected in Figure, that is, at 30 degrees Celsius of water temperature, maximum ozone concentration is 20 wt %. At this time, the power supply for an ozone generator 3 operates with maximum power approximately 100 kW. When a water temperature decreases to be 10 degrees Celsius, efficiency of ozone generation becomes high. Therefore, power of a power supply decreases to be approximately 85 kW, margin of power of a power supply is yielded. Due to the presence of margin of power of a power supply, even when an ozone concentration is increased and ozone generation efficiency decreases, by increasing power of a power supply to be 100 kW, an ozone generation amount 10 kg/h can be generated. In an example shown in FIG. 3, maximum ozone concentration can be increased to be approximately 13 wt %.

Further, in a case where an ozone generation amount is lower than rated amount, for example in a case of 5 kg/h, when a water temperature is 10 degrees Celsius, maximum ozone concentration can be increased to be 16 wt %. When an ozone concentration is increased, efficiency decreases, therefore, more electric power than electric power at 10 wt % is required. However, power supply has a margin of output in comparison with the time of rated conditions, therefore power can be increased.

Figure 4:
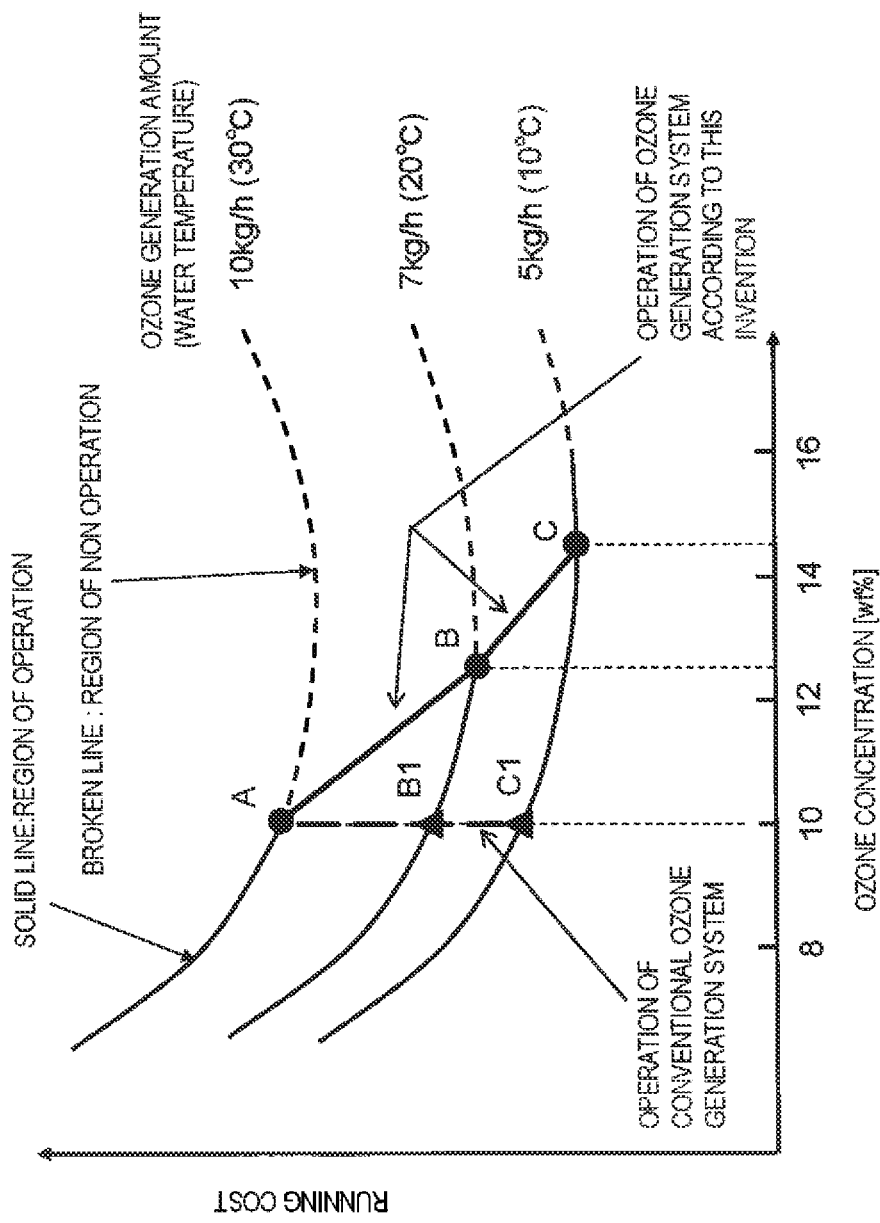
FIG. 4 is a diagrammatic view which describes one example of operating characteristics of an ozone generation system according to Embodiment 1 of this invention by comparing a conventional example.

FIG. 4 shows a running cost in a case where an ozone generation system having characteristic examples shown in FIG. 3 is used. A horizontal axis indicates an ozone concentration and a longitudinal axis indicates a running cost. In FIG. 4, a part which is indicated by a solid line is a region where operation can be performed with power lower than maximum rated power of a power supply for an ozone generator 3, and a part which indicated by a broken line is a region where operation can not be performed because power of a supply capacity is not sufficient. In summer, at a water temperature of 30 degrees Celsius, an ozone generation amount of 10 kg/h is required. Consequently, operation is performed at an ozone concentration 10 wt % (at a point indicated by A) where a running cost is a minimum in a region where operation can be performed (indicated by a solid line). In spring and autumn, at a water temperature 20 degrees Celsius, an ozone generation amount 7 kg/h is required. Consequently, operation is performed at an ozone concentration 12.5 wt % (at a point indicated by B) where a running cost is a minimum in a region where operation can be performed. In winter, at a water temperature 10 degrees Celsius, an ozone generation amount 5 kg/h is required. Consequently, operation is performed at an ozone concentration 14.5 wt % (at a point indicated by C) where a running cost is a minimum in a region where operation can be performed.

A control method at an optimum point of ozone concentration where a running cost is a minimum, that is, a method of running cost minimum control is as follows In the controller 20, using a cooling water temperature and necessary ozone generation amount as a parameter, characteristic of electricity consumption of the ozone generator 1 and the power supply for an ozone generator 3, and maximum rated power of a power supply are inputted in advance so as to be stored in an electricity consumption characteristic storing part 25. In the control parameter setting unit 24, an electricity charge is calculated based on the stored characteristic and the electricity charge unit price which is stored in the electricity charge unit price storing part 22. Based on the oxygen gas charge unit price which is stored in the gas charge unit price storing part 23, an oxygen gas charge is calculated, and a running cost is calculated by adding the electricity charge to the obtained oxygen gas charge. From the characteristic curve, operating points of the optimum ozone concentration (point A, point B, point C) are calculated. On the other hand, in the control parameter setting unit 24, at a point when an electricity charge unit price and an oxygen gas charge unit price are inputted, using a cooling water temperature and necessary ozone generation amount as a parameter, in each group consisting of a cooling temperature and necessary ozone generation amount, an ozone concentration is calculated so as for a running cost to be a minimum, data in a table of optimum ozone concentration shown in FIG. 5 is prepared. Here, an ozone generation amount is obtained by multiplying an ozone concentration and a gas flow rate. Necessary ozone generation amount is an amount of ozone which is required by a system, and when one of an ozone concentration and a gas flow rate which are values to be determined in advance is determined, other can be determined, Consequently, an ozone concentration and a gas flow rate will be referred as an ozone generation amount basic parameters. Data in a table of optimum ozone concentration shown in FIG. 5 is stored in an ozone generation amount basic parameter optimum value storing part 26.

Figure 6:
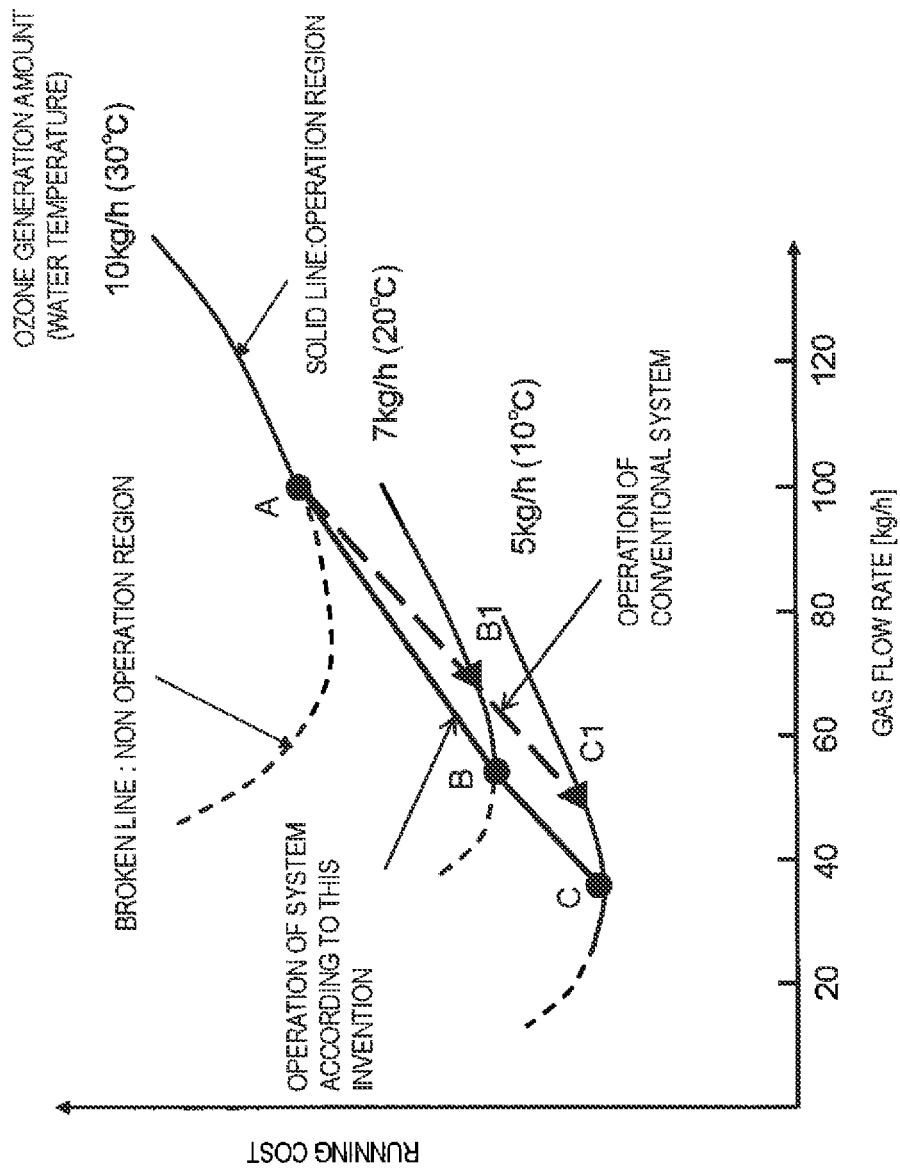
FIG. 6 is a diagrammatic view which describes another example of operating characteristics of an ozone generation system according to Embodiment 1 of this invention by comparing a conventional example.

Here, instead of an ozone concentration, an optimum value of a gas flow rate may be stored in the ozone generation amount basic parameter optimum value storing part 26. FIG. 6 shows operation characteristics of the same device having the operation characteristics shown in FIG. 4, and a horizontal axis indicates a gas flow rate and a longitudinal axis indicates a running cost. In FIG. 6, a part which is indicated by a solid line is a region where operation can be performed with power lower than maximum rated power of the power supply for an ozone generator 3, and a part which indicated by a broken line is a region where operation can not be performed because power supply capacity is not sufficient. In summer, at a water temperature of 30 degrees Celsius, an ozone generation amount of 10 kg/h is required. Consequently, operation is performed at a gas flow rate 100 kg/h (at a point indicated by A) where a running cost is a minimum in a region where operation can be performed (indicated by a solid line) In spring and autumn, at a water temperature 20 degrees Celsius, an ozone generation amount 7 kg/h is required. Consequently, operation is performed at a gas flow rate 56 kg/h (at a point indicated by B) where a running cost is a minimum in a region where operation can be performed. In winter, at a water temperature 10 degrees Celsius, an ozone generation amount 5 kg/h is required. Consequently, operation is performed at a gas flow rate 34.5 kg/h (at a point indicated by C) where a running cost is a minimum in a region where operation can be performed.

An operation method at an optimum point of a gas flow rate is as follows. In the controller 20, using a cooling water temperature and necessary ozone generation amount as a parameter, characteristics of electricity consumption of the ozone generator 1 and the power supply for an ozone generator 3 are inputted in advance so as to be stored in the electricity consumption characteristic storing part 25. In the control parameter setting unit 24, an electricity charge is calculated based on the stored characteristic and an electricity charge unit price which is stored in the electricity charge unit price storing part 22. Further, based on an oxygen gas charge unit price which is stored in the gas charge unit price storing part 23, an oxygen gas charge is calculated, and a running cost is calculated by adding the electricity charge to the obtained oxygen gas charge. From the characteristic curve, operating points of the optimum gas flow rate (A point, B point, C point shown in FIG. 6) are calculated. On the other hand, in the control parameter setting unit 24, at a point when an electricity charge unit price and an oxygen gas charge unit price are inputted, using a cooling water temperature and necessary ozone generation amount as a parameter, in each group consisting of a cooling temperature and necessary ozone generation amount, a gas flow rate is calculated so as for a running cost to be a minimum, data in a table of gas flow rates shown in FIG. 7 is prepared. The data of an optimum gas flow rate shown in FIG. 7 is stored in the ozone generation amount basic parameter optimum value storing part 26.

As above-mentioned, in each group consisting of a cooling temperature and necessary ozone generation amount, by storing an ozone concentration or a gas flow rate at which a running cost is a minimum as data, S/W design cost and manufacturing cost of a controller can be reduced.

In the control parameter setting unit 24, based on data which is stored in the ozone generation amount basic parameter optimum value storing part 26, and a cooling water temperature and necessary ozone generation amount during operation, an optimum gas flow rate or an optimum ozone concentration is read out. When an optimum gas flow rate or an optimum ozone concentration is determined, other will be calculated based on following equation, and an optimum ozone concentration and an optimum gas flow rate will be determined.

(necessary ozone generation amount)=(an optimum gas flow rate)×(an optimum ozone concentration)

The above-mentioned is an ozone generation amount basic parameter value determining step which determines an ozone generation amount basic parameter value according to Embodiment 1.

Further, in the above, a case in which one of an optimum ozone generation and an optimum gas flow rate is stored in the ozone generation amount basic parameter optimum value storing part 26 was described, however, a group consisting of an optimum ozone concentration and an optimum gas flow rate may be stored. In this case, it is not necessary to calculate one from the other.

Next, the degree of opening of a gas flow rate control valve 4 is controlled so as for an output value of a gas flow measuring device to be the optimum gas flow rate. After that, a power command value to a power supply for an ozone generator 3 is adjusted so as for an output of an ozone concentration measuring device to be the optimum ozone concentration which is determined. According to the above-mentioned running cost minimum control, operation can be performed with a minimum running cost.

In conventional ozone generation systems, as shown in FIG. 4 and FIG. 6, operation is performed with an ozone concentration kept constant. Consequently, in spring and autumn, operation is performed at an operation point B1, and in winter, operation is performed at an operation point C1. In comparison with a running cost at conventional operating point B1 and C1, a running cost at B operating point and at C operating point shown in FIG. 4 and FIG. 6 is lower, respectively. Even in the same season, water amount which is used in water purifying plants is different between daytime and night. Consequently, necessary ozone generation amount is different between daytime and night, and an optimum ozone concentration varies depending on a time of day. Further, as can be understood from the description of Embodiment 1, since an operation ozone concentration and an operation gas flow rate vary depending on a cooling water temperature and necessary ozone generation amount, it is necessary such that both parameters of a cooling water temperature and necessary ozone generation amount are inputted in the controller 20.

Further, a running cost is affected by an oxygen gas charge unit price and an electricity charge unit price. An electricity charge of an ozone generating device depends on a place where the ozone generating device is operated, for example, a country, a region, an area, etc. Further, a transportation cost depends on whether a place where an ozone generating device is operated is close to a factory for supplying liquid oxygen or not. Consequently, an oxygen gas charge unit price is changed. By storing the above-mentioned electricity charge unit price and gas charge unit price, and by determining an operating point according to the above-mentioned determining method, even when a variation of efficiency of an ozone generator which is caused by cooling water temperature variation depending on seasons is generated, and even when a variation of amount of water to be treated and change of quality of water to be treated depending on seasons and a time of day are generated, operation can be always performed with minimum running cost.

Further, in some cases, an electricity charge depends on seasons and a time of day. In this case, by preparing a table of an optimum ozone concentration and an optimum gas flow rate shown in FIG. 5 and FIG. 7 for every typical electricity unit price, even when an electricity charge is changed, operation can be always performed with a minimum running cost.

In a case of a large-capacity ozone generator which is used for water treatment, an ozone generator in which a plurality of discharge tubes is connected in parallel is used In order to generate ozone efficiently with a high concentration of ozone concentration 10 wt % or higher which is used for water treatment at present, it is preferable such that this ozone generator is configured to have a discharge gap length D shown in FIG. 2 is 0.3 mm or shorter (preferably, 0.2 mm or shorter), and a gas pressure in a range of 0.08 to 0.20 MPa (G). By the above-mentioned ozone generator, ozone can be generated efficiently even with ozone concentration 12 wt %. Particularly, by setting a discharge gap length to be 0.3 mm or less, ozone can be generated efficiently by 14 wt % of ozone concentration. However, as described regarding a problem of this invention, when a device is designed to generate ozone with a high concentration, for example, 12 to 14 wt %, ozone generation efficiency is lower in comparison with a device which generates ozone of normal concentration 10 wt %. As a result, it is required to increase output of power supply. Further, it is required to increase a number of discharge tubes to be used for an ozone generator. Consequently, an initial cost of a device is increased. Therefore, a device which can generate high concentration ozone can be manufactured; however, considering an initial cost, utilization of ozone whose concentration exceeds 10 wt % has not been prevailed.

By combining a running cost minimum control according to Embodiment 1 of this invention and an ozone generator in which a discharge gap length D and a gas pressure are designed as above-mentioned, an ozone generation system in which an initial cost is made equal to that of a normal ozone generation system and a running cost can be reduced can be provided.

In the conditions other than the above-mentioned operation condition, an ozone generation with a high ozone concentration is inefficient. Therefore, in comparison with a case in which operation is performed with constant ozone concentration of 10 wt %, a reduction effect is small, 2% or less. In an ozone generator having a discharge gap length of 0.3 mm or shorter, a reduction of a running cost of 3% or higher can be realized. Further, in an ozone generator having a discharge gap length of 0.2 mm or shorter, a reduction of a running cost of 5% or higher can be realized. By applying this invention to an ozone generator with a small discharge gap length as above-mentioned, that is, a discharge gap length of 0.3 mm or less, more preferably, a discharge gap length of 0.2 mm or less, more great effect can be produced.

Embodiment 2

Figure 8:
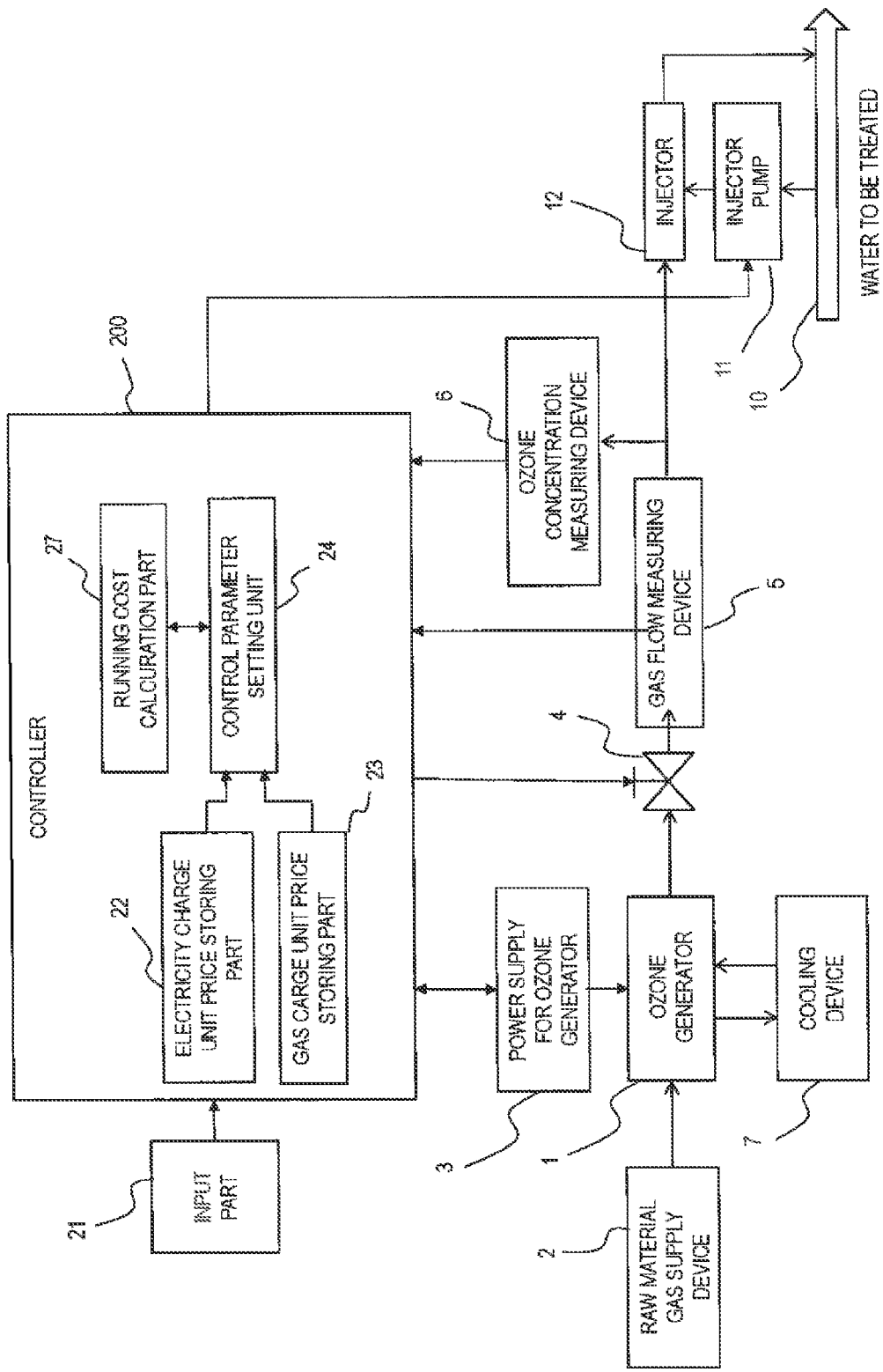
FIG. 8 is a block diagram showing the rough constitution of an ozone generation system according to Embodiment 2 of this invention.
Figure 9:
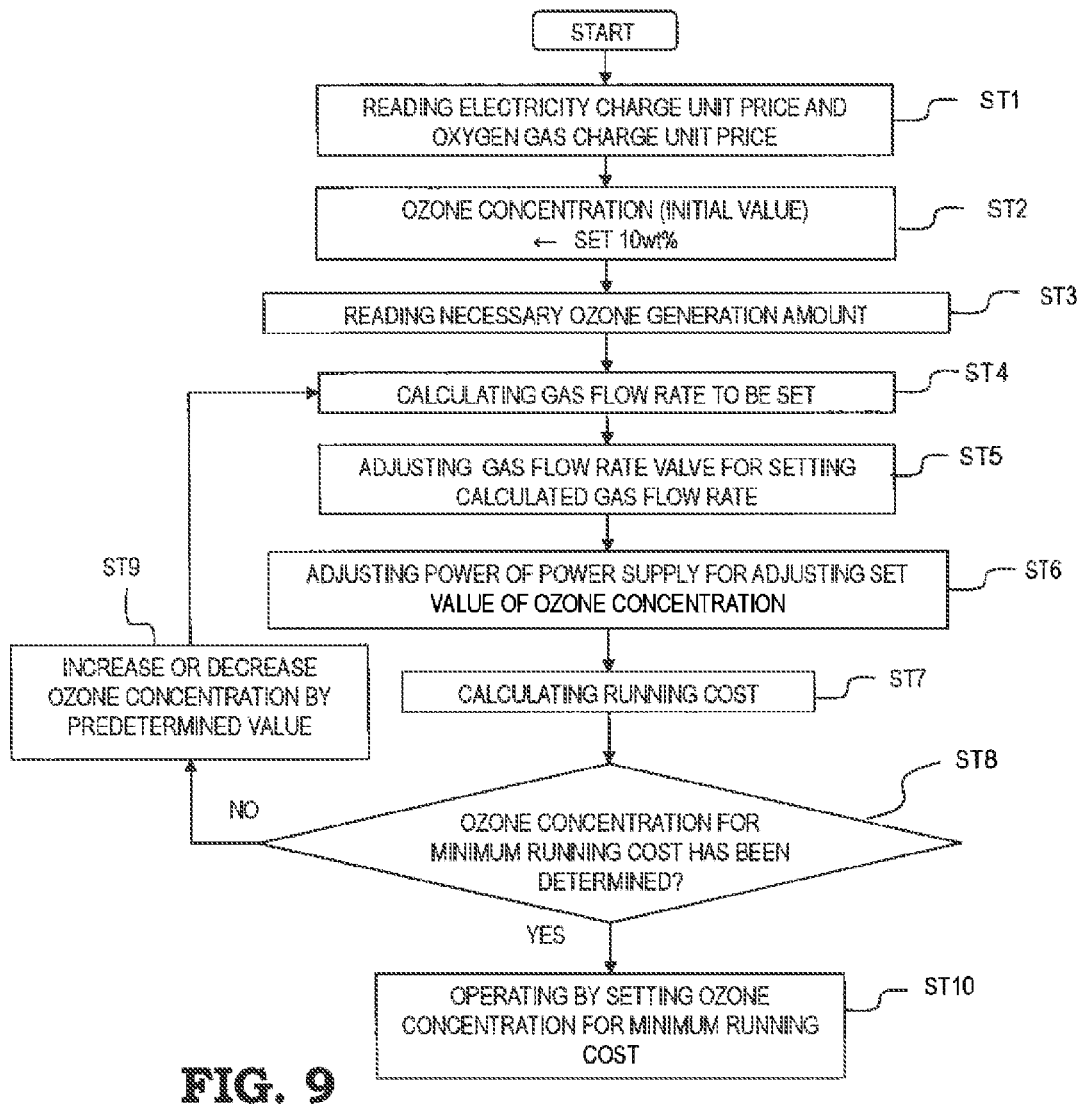
FIG. 9 is a flow chart showing the control of an ozone generation system according to Embodiment 2 of this invention.

FIG. 8 is a block diagram showing the outline of an ozone generation system according to Embodiment 2 of this invention. In FIG. 8, the same reference character as that in FIG. 1 indicates the same or a corresponding part. FIG. 9 shows a control flow of a controller 200. In Embodiment 1, an optimum ozone concentration or an optimum gas flow rate at which a running cost is a minimum is stored in an ozone generation amount basic parameter optimum value storing part 26 in advance. On the other hand, in an ozone generation system according to Embodiment 2 of this invention, by calculating a running cost while an ozone concentration is varied, the controller 200 finds an ozone concentration and a gas flow rate at which a running cost is a minimum by itself. In Embodiment 2, a thermometer for cooling water is not required, and it is not required to input data in the controller 200 for a cooling water temperature. However, a cooling water temperature may be inputted as a guide for setting an initial indicated value.

The details of concrete operation will be as follows. First, from an electricity charge unit price storing part and a gas charge unit price storing part 23, an electricity charge unit price and an oxygen gas charge unit price are read (ST1). Next, an initial indicated value of ozone concentration (in FIG. 9, it is set to be 10 wt %) is set (ST2) and necessary ozone generation amount is read (ST3). A gas flow rate to be set is obtained by following equation based on necessary ozone generation amount, that is, ozone generation amount to be generated by an ozone generator and an ozone concentration (ST4).

(a gas flow rate)=(ozone generation amount)÷(ozone concentration)

A flow rate control valve is controlled so as for a measured value of a gas flow measuring device to be equal to a gas flow rate which is obtained from the above-mentioned equation (ST5). After that, power of a power supply is adjusted and power of a power supply for an ozone generator 3 is adjusted for a measured value of an ozone concentration measuring device to be an indicated value of the ozone concentration measuring device (ST6). In a running cost calculation part 27, an electricity charge is calculated based on consumption power of a power supply, and a gas charge is calculated based on a gas flow rate so as to calculate a running cost in this ozone concentration. (ST7) The above-mentioned is a running cost calculation control step, and after this running cost calculation control step is performed, whether an ozone concentration at which a running cost is a minimum is determined or not is judged (ST8). In a case where the above-determination is not determined, by adding only a predetermined value, for example, by adding 0.5 wt % to an ozone concentration indicated value (ST9), the same as above-mentioned is performed so as to calculate a running cost at this operating point. When a running cost decreases, an ozone concentration indicated value is increased. On the contrary, when a running cost increases, an ozone concentration indicated value is decreased. The above-mentioned is a running cost comparison step, the running cost comparison step is repeated by varying an ozone concentration until an ozone concentration can be determined at which a running cost is a minimum, and an ozone concentration at which a running cost is a minimum is determined. The above-mentioned is an ozone generation amount basic parameter value determining step which determines an ozone generation amount basic parameter value in Embodiment 2. When an ozone concentration and a gas flow rate at which a running cost is a minimum can be determined by the ozone generation amount basic parameter value determining step, by setting the ozone concentration and the gas flow rate to be the determined values, and operation of an ozone generation system is continued (ST10). In the above, at first, an ozone concentration is set, however, first a gas flow rate may be set. When one of them is set, the other may be calculated based on necessary ozone generation amount.

In Embodiment 2, in a case where water to be treated clean water, an indicated value of necessary ozone generation amount is varied, for example, within approximately one hour. On the other hand, it takes approximately one minute for a control loop of a gas flow rate control to be stable, and it takes approximately one to five minutes for a control loop of an ozone concentration control to be stable. Consequently, it takes five to thirty minutes to obtain an optimum point of concentration by varying three or four points of ozone concentration, and the above time of day is shorter than a time of day when an indicated value of ozone generation amount is varied. Therefore, an optimum point of ozone concentration can be calculated.

In Embodiment 2, an optimum point of ozone generation is obtained at all times. Therefore, even in a case when an ozone generator 1 is deteriorated over time, the ozone generation system according to Embodiment 2 is effective. For example, in a case where a discharge tube is deteriorated, predetermined ozone generation efficiency can not be obtained; as a result, an optimum point of ozone concentration will be shifted from an optimum point of ozone concentration when immediately after an ozone generator is manufactured. According to Embodiment 2, an optimum point of ozone generation is calculated at all times. Therefore, an operation can be performed with a minimum running cost without being affected by age deterioration of a discharge tube.

Embodiment 3

Figure 10:
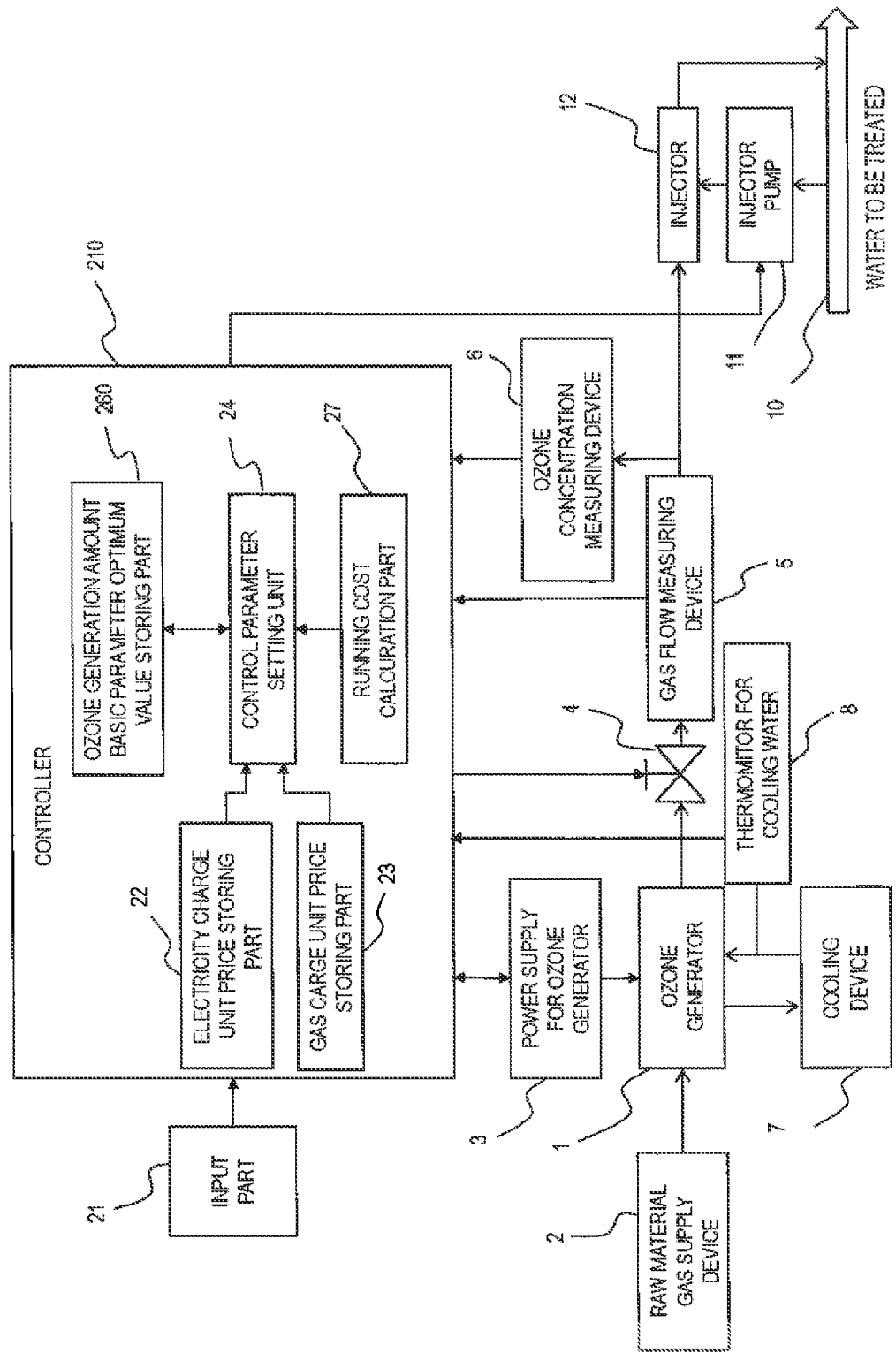
FIG. 10 is a block diagram showing the rough constitution of an ozone generation system according to Embodiment 3 of this invention;.

FIG. 10 is a block diagram showing the outline of an ozone generation system according to Embodiment 3 of this invention, In FIG. 10, the same reference character as that in FIG. 1 and FIG. 8 indicates the same or a corresponding part. Embodiment 3 is an embodiment in which control can be improved further by combining Embodiment 1 and Embodiment 2. In Embodiment 3, in a controller 210, with respect to two parameters, that is, with respect to a cooling water temperature and an ozone generation amount, an optimum ozone concentration data (table of an optimum ozone concentration) shown in FIG. 5 or an optimum gas flow rate (table of an optimum gas flow rate) shown in FIG. 7 is stored in an ozone generation amount basic parameter optimum value storing part 260 as an initial value. In the following, a case in which data of an optimum ozone concentration is stored in the ozone generation amount basic parameter optimum value storing part 260 will be described.

First, operation will be started according to a table of an optimum ozone concentration. After the operation is started, based on a table of an optimum ozone concentration, in the same steps as those of Embodiment 2, by varying an ozone concentration around the optimum ozone concentration, an optimum value of an ozone concentration at this point is obtained. In doing so, based on the result, a table of an optimum ozone concentration is updated. By doing the above-mentioned, control S/W can be simplified, therefore, device cost can be reduced.

Further, by performing the above-mentioned control, an aged deterioration condition of device can be reflected on a table of an optimum ozone concentration, therefore, it is required only to perform a running cost minimum control at surrounding points of an optimum point of ozone concentration at all times. Consequently, a range in which an ozone concentration is varied is narrow, and as a result, control can be performed rapidly. Further, regarding an ozone concentration, a shifted amount from an optimum point is small; therefore, running cost can be controlled to be a minimum.

In examples in FIG. 5 and FIG. 7, a case in which an interval of cooling water temperature is set to be 5 degrees Celsius and ozone generation amount rate is set to be 10 kg/h and its interval is set to be 1 kg/h is shown however, by making the interval finer, running cost can be minimized further.

Embodiment 4

In Embodiments 1 to 3, regarding a running cost, only an electricity charge and a gas charge of an ozone generator are considered. However, as shown in FIG. 1, in a case where an injector 12 for dissolving an ozone gas in water is used as an auxiliary device, by adding an electricity charge of consumption power of an injector pump 11 to a running cost to be evaluated, operation with less running cost can be performed. In Embodiment 4, by adjusting a ratio of a gas flow rate G and an amount of water L which flows in the injector 12 (G/L ratio) to be constant, a dissolution rate of ozone in water is increased. Consequently, even if necessary ozone concentration is same, a gas flow rate G is varied by an ozone concentration, therefore, it is required to adjust an amount of water L, and power of the injector pump 11 is varied. An optimum ozone concentration is determined so as for a running cost to be a minimum value including an electricity charge of the injector pump 11, therefore, a running cost as whole system can be decreased.

Further, in some cases, PSA (Pressure Swing Absorption) or VPSA (Vacuum Pressure Swing Absorption) is used as a raw material gas supply device. PSA and VPSA are devices for concentrating an oxygen gas from air by using an adsorption agent. Generally, in many cases, PSA (or VPSA) is used with constant gas flow rate; however, recently, manufacturing of devices which can adjust a gas flow rate is started. In this case, a flow rate of air of a compressor or a blower for sending air in PSA (or VPSA) is varied; therefore, a consumption power amount of an auxiliary device such as a compressor or a blower is varied. As a result, an electricity charge is varied. Consequently, in a case where PSA (or VPSA) is used by varying a flow rate of material gas, by optimizing an ozone concentration by including an electricity charge of equipment to be used for PSA (or VPSA) such as a compressor or a blower, a running cost as whole system can be reduced.

Further, consumption power to be used in addition to the above is small, however, by including consumption power of a cooling device 7 for sending cooling water to the ozone generator 1 or consumption power to be used for a waste ozone decomposition device for decomposing ozone which is not consumed in an ozone reaction tank (not shown in Figure), that is, consumption power of an auxiliary device so as to be evaluated, further, a running cost as whole system can be reduced. Regarding the cooling device 7 of the ozone generator 1, when an ozone generation amount is decreased, necessary water amount is decreased. Therefore, consumption power can be reduced. Alternatively, when a gas flow rate is reduced, consumption power of a motor driving a fan for a waste ozone can be decreased. Consequently, by controlling an ozone concentration so as for a running cost as whole system to be a minimum, cost can be reduced.

Embodiment 5

In Embodiments 1 to 4, a case in which a running cost minimum control is performed with a minimum running cost all times by an optimum ozone concentration or an optimum gas flow rate is described, however, in some cases, a user may use an ozone generator with constant ozone concentration, therefore, it is acceptable such that an ozone generator is configured to switch running cost control ON and OFF. For example, a running cost minimum control ON button (economy mode button) and a switch (economy mode switch) are provided in a controller. Alternatively, an ozone generator may be configured to have a touch-panel on which operation can be switched. A user can select a running cost minimum operation as occasion demands, and operation in which a running cost can be reduced can be performed.

Further, in a display screen image of a controller, how much can an amount of a running cost be reduced is shown. In order to display the above, an ozone concentration as criteria (for example, 10 wt %) is inputted, and in comparison with a case in which operation is performed with criteria ozone concentration, how much can an amount of running cost be reduced by performing a running cost minimum control is shown, Regarding a reduced amount of a running cost, an integrated value in a day may be shown, an integrated value after operation starts maybe shown as cost reduction amount actual cumulative total value, trend of a day, a week, a month or a year may be shown as a table or a graph. As shown by the above, a user can figure out the reduced amount correctly. Further, regarding numerical value to be displayed, not only displaying a reduced amount of running cost, by also displaying a value of running cost, whole cost can be figured out, further, cost maybe displayed separately, for example, a gas charge, an electricity charge, etc.

Further, by evaluating a case in which operation was performed with an ozone concentration constant control without a running cost minimum control operation and a running cost minimum control operation is performed, an expected amount, that is, how much can a running cost be reduced can be evaluated, and the expected amount is displayed on a display screen. Particularly, when the above-mentioned display is applied to the configuration in which a running cost minimum control ON/OFF can be switched, it is easier for a user to judge whether an operation is switched to a running cost minimum control or not.

Further, in a case where a diffuser tube or an gas dispersion disk is used as a device for dissolving ozone in water is used, when a gas flow rate is decreased excessively, in some cases, the diffuser tube or the gas dispersion disk is easy to cause clogging. Consequently, in some cases, it is necessary to arrange a lower limit of a gas flow rate. In order to deal with the above-mentioned condition, an ozone generator is designed to have the configuration in which a higher limit of an ozone concentration can be set or a lower limit of a gas flow rate can be set. As a result, a running cost can be minimized while ozone treatment performance is exhibited. Further, when a raw material gas supply device 2 has a gas supply capacity upper limit, and when too much gas flow rate is flown in the ozone generator 1, in some cases, a pressure loss of the ozone generator 1 is increased so as to reduce efficiency. Consequently, when an ozone generator has the configuration in which a lower limit of an ozone concentration can be set or a higher limit of gas flow rate can be set, a reliable operation can be performed according to supply capacity of the device.

Embodiment 6

Figure 11:
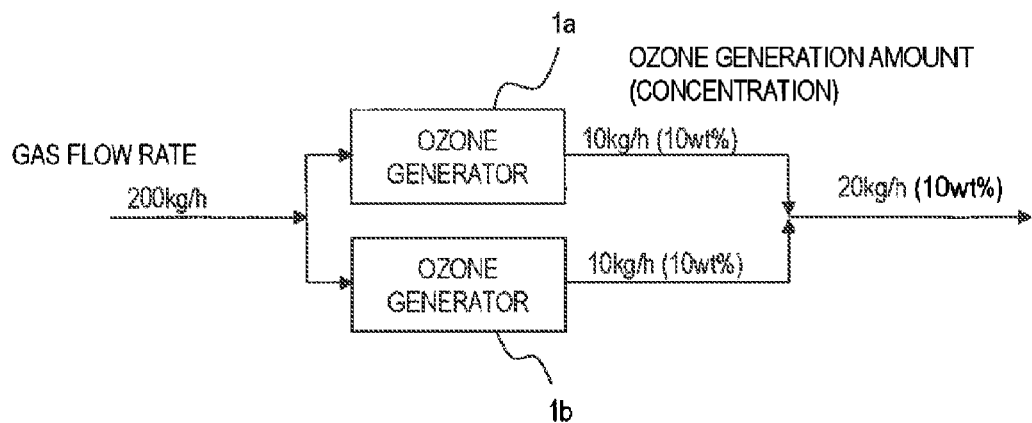
FIG. 11 is a block diagram showing a basic example of operation of main part of an ozone generation system according to Embodiment 6 of this invention.
Figure 12:
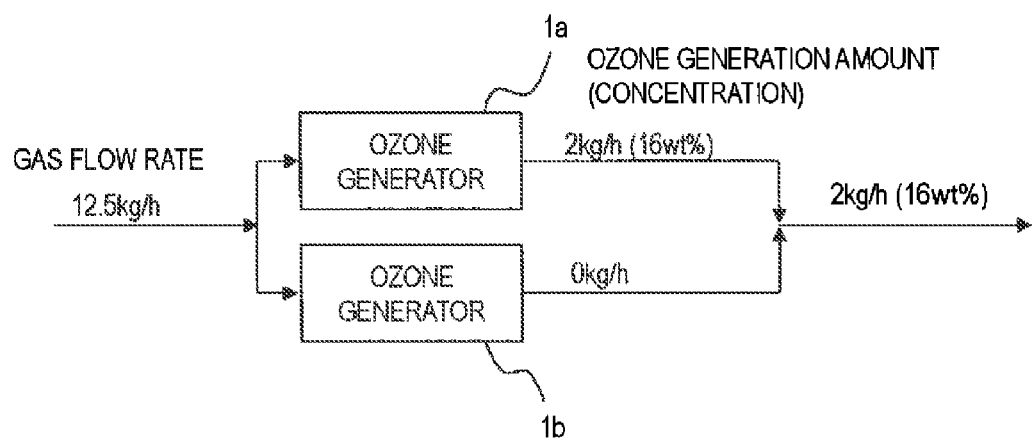
FIG. 12 is a block diagram showing another example of operation of main part of an ozone generation system according to Embodiment 6 of this invention.

In general ozone treatment system, in many cases, a plurality of ozone generators is used. In this case, when a rated operation is performed, as shown in FIG. 11, for example, full power operation of two ozone generators 1a and 1b with ozone generation amount 10 kg/h and ozone concentration 10 wt % is performed, respectively. In a case where necessary amount of ozone generation is gradually reduced, for example, in a case where 80% of rated ozone generation is generated, a running cost is a minimum when both of two ozone generators are operated with ozone generation amount 8 kg/h and ozone concentration 12 wt %. Further, in a case where an ozone generation amount is decreased, for example, in a case of 10% of rated ozone generation amount, a running cost is lower when an operation of the ozone generator 1b is stopped, and only the ozone generator 1a is operated with an ozone generation amount 2 kg/h, ozone concentration 16 wt %, as shown in FIG. 12 than when two ozone generators 1a and 1b are operated with 1 kg/h, respectively. This is because, when output is decreased, ratio of no-load loss (loss of power-supply transformer, power consumption of fan for cooling power supply, power consumption of generator cooling water pump, etc.) is increased; ozone generation efficiency with respect to whole of power supply for an ozone generator is deteriorated.

In a case where a plurality of ozone generators are operated, a running cost is calculated by varying number of ozone generators, and the number of ozone generators and an ozone concentration are determined so as for a running cost to be minimum. By doing the above, a running cost of whole system can be reduced.

Embodiment 7

Figure 13:
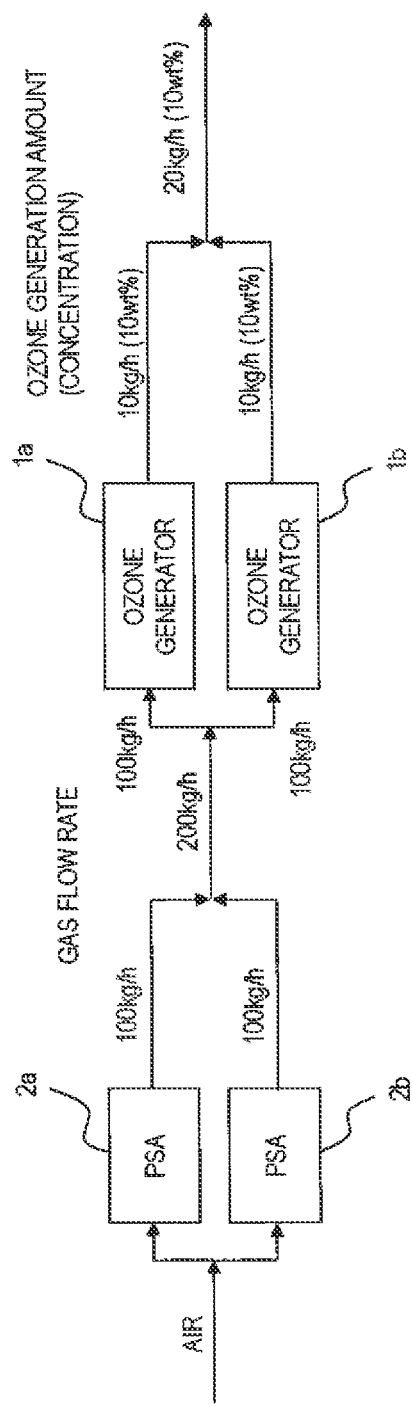
FIG. 13 is a block diagram showing a basic example of operation of main part of an ozone generation system according to Embodiment 7 of this invention.
Figure 14:
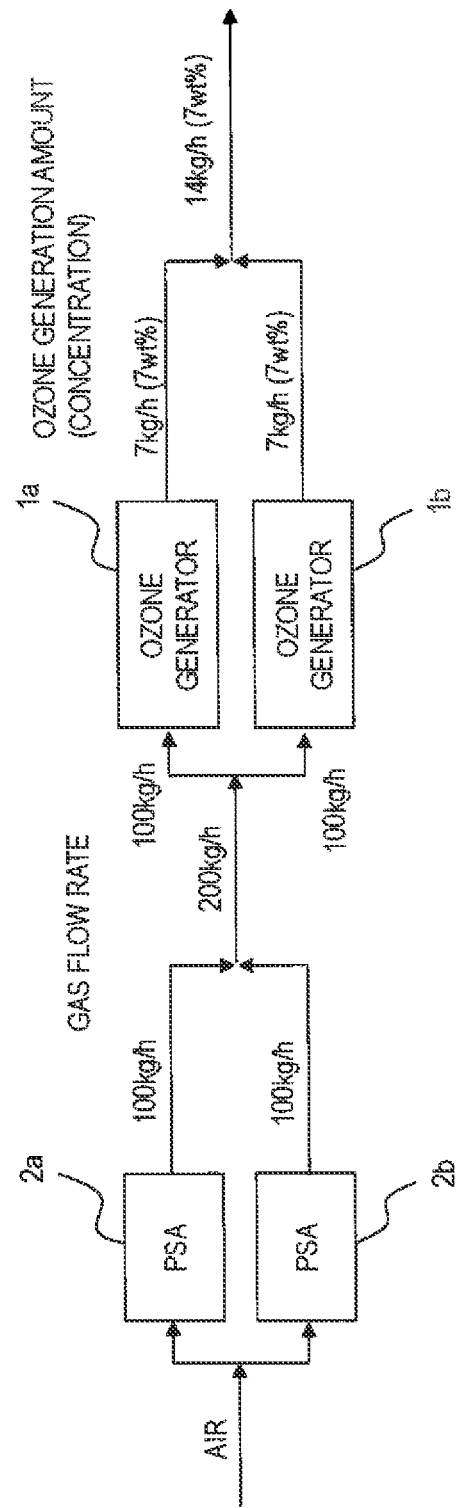
FIG. 14 is a block diagram showing a comparative example of operation of a main part of an ozone generation system according to Embodiment 7 of this invention.

FIG. 13 shows a case in which two oxygen generators (FSA) 2a and 2b are used as a raw material gas supply device 2 and two ozone generators 1a and 1b are used. The ozone generators 1a and 1b are operated with ozone generation amount 10 kg/h and ozone concentration 10 wt %, respectively. The PSA 2a and 2b supply oxygen gas flow rate 100 kg/h, respectively. It is difficult for PSA to vary a gas flow rate. Consequently, when an ozone generation amount is decreased from a rated amount, in many cases, an ozone generation amount is adjusted by decreasing an ozone concentration while keeping a gas flow rate constant. In this case, a device for forcibly supplying gas inside the PSA continuously supplies a fixed amount of gas; therefore, electricity consumption is large. Even when an ozone generation amount is decreased, an electricity consumption of PSA can not be decreased. Consequently, operation can not be performed economically. For example, FIG. 14 shows a flow rate of an oxygen gas, an ozone generation amount and an ozone concentration of each part in a case where an ozone generation is 70% of rated amount.

Figure 15:
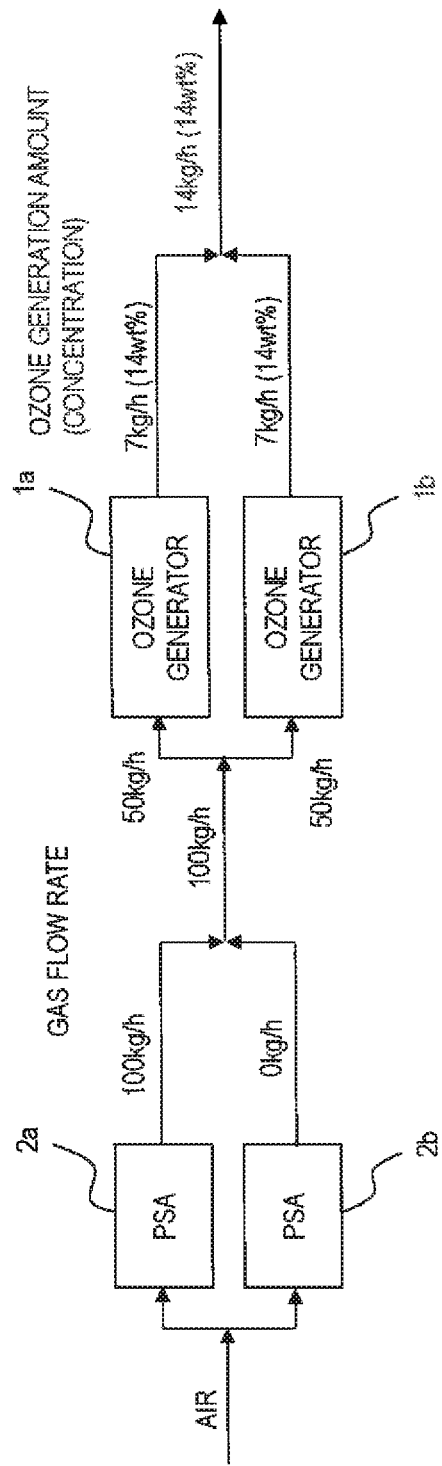
FIG. 15 is a block diagram showing one example of operation of an ozone generation system according to Embodiment 7 of this invention.

In Embodiment 7, a case in which the number of PSA to be operated is varied for calculating a running cost so as to obtain an optimum number of PSA to be operated and an ozone concentration. Based on the above-mentioned result, operation as shown in FIG. 15 is performed. Operation of PSA 2b is stopped and only PSA 2a supplies 100 kg/h of oxygen gas. 50 kg/h of oxygen gas is supplied to two ozone generators 1a and 1b, respectively, the ozone generators 1a and 1b operate with ozone concentration 14 wt % so as for a running cost to be a minimum The ozone generators 1a and 1b generate 7 kg/h of ozone, respectively. In this example, only one PSA is operated, therefore electricity consumption of PSA is decreased to be half. In Embodiment 7, operation can be performed in which running cost as a whole can be suppressed.

REFERENCE CHARACTERS

1: ozone generator
2: raw material gas supply device
3: power supply for an ozone generator
4: gas flow rate control valve
5: gas flow measuring device
6: ozone concentration measuring device
7: cooling device
8: thermometer for cooling water
10: water to be treated
12: injector
20, 200, 210: controller
21: input part
22: electricity charge unit price storing part
23: gas charge unit price storing part
24: control parameter setting unit 25: electricity consumption characteristic storing part
26, 260: ozone generation amount basic parameter optimum value storing part
27: running cost calculation part
100: discharge tube
110: discharge gap

The invention claimed is:

1. An ozone generation system comprising:
an ozone generator having discharge tubes,
a raw material gas supply device which supplies raw material gas containing oxygen,
a power supply for an ozone generator which applies a high-frequency high voltage to the discharge tubes,
a cooling device which flows cooling water to the periphery of the discharge tubes,
a gas flow rate controller which controls the flow rate of an ozonized gas which is outputted from the ozone generator,
an ozone concentration measuring device which measures an ozone concentration of the ozonized gas,
a cooling water thermometer which measures a temperature of the cooling water
and a controller which controls power of the power supply for an ozone generator and the gas flow rate controller,
wherein the controller comprises
an electricity charge unit price storing part which stores an electricity charge unit price, a gas charge unit price storing part which stores a gas charge unit price and an ozone generation amount basic parameter optimum value storing part which stores optimum values of one of ozone generation amount basic parameters, which are the ozone concentration and the gas flow rate,
wherein an optimum value is a determined value at which a running cost is a minimum value, using cooling water temperature and necessary ozone generation amount as input parameters,
and wherein running cost is determined on the basis of an electricity charge calculated by the electricity charge unit price stored in the electricity charge unit price storing part and a gas charge calculated by the gas charge unit price stored in the gas charge unit price storing part; and
wherein the controller is configured to:
read, from the ozone generation amount basic parameter optimum value storing part, an ozone generation amount basic parameter optimum value which corresponds to a cooling water thermometer measured value of the cooling water and a necessary ozone generation amount,
determine an ozone concentration and a gas flow rate at which the ozone generator is operated based on the ozone generation amount basic parameter optimum value which is read and the necessary ozone generation amount, and
control the gas flow rate controller so as for a gas flow rate to be the determined value and the power of the power supply for an ozone generator so as for the ozone concentration measured value of the ozone concentration measuring device to be the determined value.

2. An ozone generation system according to claim 1, wherein the running cost is calculated by including consumption power of an auxiliary device.

3. An ozone generation system according to claim 1, wherein a discharge gap length of the discharge tubes is 0.3 mm or shorter, and a gas pressure in the ozone generator is in a range of 0.08 to 0.20 MPa.

4. An ozone generation system according to claim 1, wherein a plurality of ozone generators are provided, and wherein the number of ozone generators which constitute said plurality makes the running cost be a minimum, in accordance with the necessary ozone generation amount.

5. An ozone generation system according to claim 1, wherein a plurality of raw material gas supply devices are provided, and wherein the number of raw material gas supply devices which constitute said plurality makes the running cost be a minimum, in accordance with the necessary ozone generation amount.

6. An ozone generation system comprising
an ozone generator having discharge tubes,
a raw material gas supply device which supplies raw material gas containing oxygen,
a power supply for an ozone generator which applies a high-frequency high voltage to the discharge tubes,
a cooling device which flows cooling water to the periphery of the discharge tubes,
a gas flow rate controller which controls the flow rate of an ozonized gas which is outputted from the ozone generator,
an ozone concentration measuring device which measures an ozone concentration of the ozonized gas and
a controller which controls power of the power supply for an ozone generator and the gas flow rate controller,
wherein the controller is configured
to perform a running cost calculation control step in which the controller determines an ozone concentration and a gas flow rate at which the ozone generator is operated based on (i) a predetermined value of one ozone generation amount basic parameter selected from the group consisting of ozone concentration and gas flow rate of the ozonized gas, and (ii) a necessary ozone generation amount, controls the gas flow rate controller so as for the gas flow rate to be the determined gas flow rate and the power of the power supply for an ozone generator so as for the ozone concentration to be the determined ozone concentration and calculates a running cost based on the controlled power for the power supply for an ozone generator at this time and the determined gas flow rate,
and to perform a running cost comparison step in which the controller determines an ozone concentration and a gas flow rate at which the ozone generator is operated subsequently by increasing or decreasing the predetermined value of the one of the ozone generation amount basic parameters, controls the gas flow rate controller so as for the gas flow rate to be the determined gas flow rate at which the ozone generator is operated subsequently and the power of the power supply for an ozone generator so as for the ozone concentration to be the determined ozone concentration at which the ozone generator is operated subsequently, calculates a running cost based on the controlled power of the power supply for an ozone generator at this time and the gas flow rate at which the ozone generator is operated subsequently, and compares the running cost which is calculated and the running costs which were calculated after the running cost calculation control step,
further to find out values of the ozone generation amount basic parameters at which a running cost is a minimum by repeating the running cost comparison step successively, to control the gas flow rate controller and the power supply for an ozone generator so as for the values to be values of the ozone generation amount basic parameters which are found out and to continue to operate the ozone generator.

7. An ozone generation system according to claim 6, further comprising
a cooling water thermometer which measures a temperature of the cooling water,
wherein the controller comprises an ozone generation amount basic parameter optimum value storing part which stores optimum values of an ozone generation amount basic parameter at which the running cost is a minimum value, based upon cooling water temperature and necessary ozone generation amount,
and wherein the controller is configured to:
read the ozone generation amount basic parameter optimum value which corresponds to a cooling water thermometer measured value of the cooling water and the necessary ozone generation amount from the ozone generation amount basic parameter optimum value storing part and
set the optimum value of the ozone generation amount basic parameter which is read to be an initial predetermined value of the ozone generation amount basic parameter.

8. A method of operating an ozone generation system comprising an ozone generator having discharge tubes,
a raw material gas supply device which supplies raw material gas containing oxygen,
a power supply for an ozone generator which applies a high-frequency high voltage to the discharge tubes,
a cooling device which flows cooling water to the periphery of the discharge tube,
a gas flow rate controller which controls the flow rate of an ozonized gas which is outputted from the ozone generator,
an ozone concentration measuring device which measures an ozone concentration of the ozonized gas,
and a controller comprising an electricity charge unit price storing part which stores an electricity charge unit price and a gas charge unit price storing part which stores a gas charge unit price,
wherein the method comprises:
a running cost calculation control step including:
determining a gas flow rate and an ozone concentration for operating the ozone generator based on (i) a predetermined value of one ozone generation amount basic parameter selected from the group consisting of ozone concentration and the gas flow rate of the ozonized gas, and (ii) a necessary ozone generation amount, and
calculating a running cost based on the power of the power supply for an ozone generator and the determined gas flow rate,
a running cost comparison step in which, after the running cost calculation control step, an ozone concentration and a gas flow rate at which the ozone generator is operated subsequently are determined by increasing or decreasing the predetermined value of the one of the ozone generation amount basic parameters, the gas flow rate controller is controlled so as for the gas flow rate to be the determined gas flow rate at which the ozone generator is operated subsequently, the power of the power supply for an ozone generator is controlled so as for the ozone concentration to be the determined ozone concentration at which the ozone generator is operated subsequently, a new running cost is calculated based on the power of the power supply for an ozone generator at this time and the determined gas flow rate and the new running cost is compared with previously calculated running costs,
a step in which values of the ozone generation amount basic parameters at which a running cost is a minimum are determined by repeating the running cost comparison step successively and
a step in which the gas flow rate controller is controlled so as for the gas flow rate to be the determined gas flow rate and the power of the power supply for an ozone generator is controlled so as for the ozone concentration to be the determined ozone concentration.

* * * * *